April 19, 1938.    R. F. BERGMANN    2,114,555
PROTECTED SCREW TAKE-UP
Filed Oct. 9, 1935
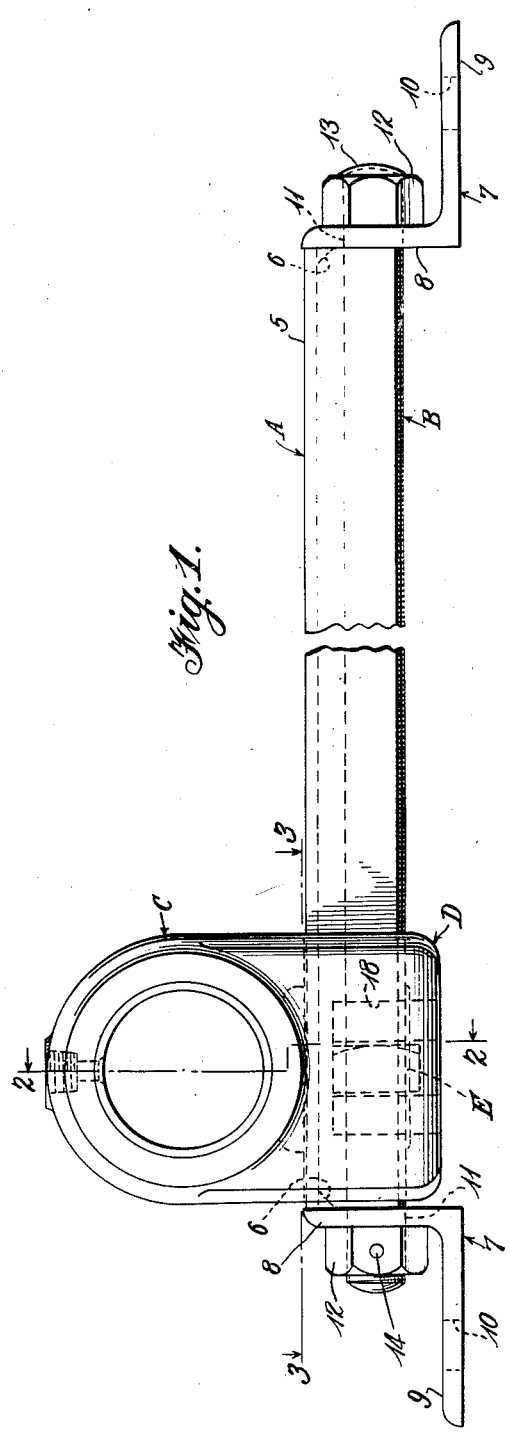
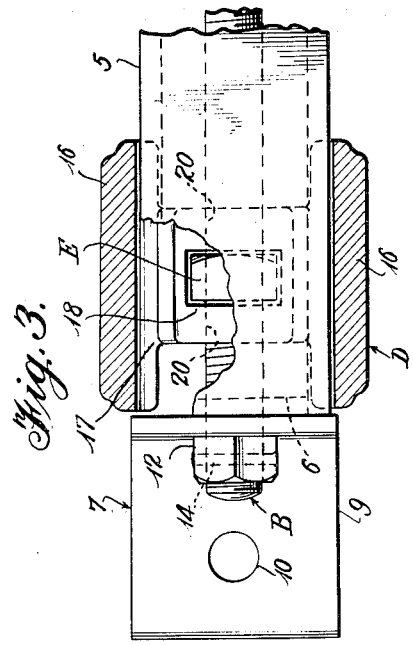
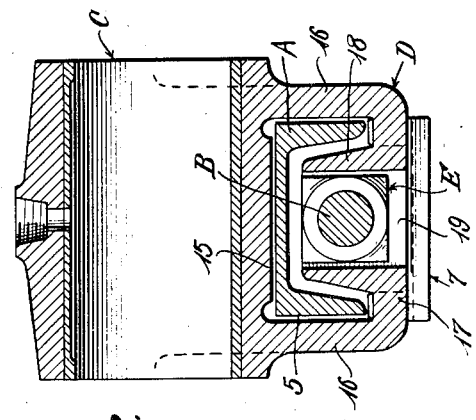
Inventor
Richard F. Bergmann
By L. Donald Myers
Attorney Patented Apr. 19, 1938

2,114,555

UNITED STATES PATENT OFFICE 2,114,555

PROTECTED SCREW TAKE-UP

Richard F. Bergmann, La Grange, Ill., assignor to Link-Belt Company, a corporation of Illinois Application October 9, 1935, Serial No. 44,267

1 Claim. (Cl. 308—59)

This invention relates to new and useful improvements in a protected screw take-up.

All protected screw take-up bearings with which I am familiar employ bolts, screws or the like to connect or hold together separable parts of frames, covers, guards or bearing blocks which must be movable relative to each other to effect assembly and dissembly of the devices. Due to stresses, strains, vibrations, and other causes, to which a bearing of this type is subjected, such bolts or screws loosen with the result that the bearing becomes clamped causing breakage if not detected in time. It is the primary object of this invention to provide a protected screw take-up which is made rugged enough not to require frequent repairs, under normal operating conditions, which necessitate taking the structure apart and permanently connecting the aforementioned separable parts, after assembly, so that they cannot become unintentionally loosened during use.

A further important object of the invention is to provide a protected screw take-up which is extremely simple, strong and rigid in construction and one which may be manufactured at a very low cost.

Another object of the invention is to provide a bearing of the above-mentioned type which occupies a minimum amount of space and which positions the shaft journaled in the bearing a minimum distance from the surface against which the end brackets are secured.

Other objects and advantages of the invention will be apparent during the course of the following description.

In the accompanying drawing forming a part of the specification and in which like numerals are employed to designate like parts throughout the same;

Figure 1 is a side elevational view of the protected screw take-up embodying this invention, Figure 2 is a vertical sectional view taken on line 2—2 of Fig. 1, and Figure 3 is a horizontal sectional view taken on line 3—3 of Fig. 1.

Broadly described, the protected screw take-up embodying this invention consists of a frame A which has journaled therein to extend longitudinally thereof, and to be protected thereby, a take-up screw B. Adjustable lengthwise of the frame A and its associated take-up screw B is a bearing C. This bearing is provided with a guiding base portion D. This bearing base encircles the frame A and the screw B. A nut E is threaded on the take-up screw B and is received within the bearing base D so that rotation of the take-up screw effects adjustment of the bearing C lengthwise of the frame A.

The detail features of construction of the protected screw take-up selected to illustrate the invention now will be described:

The frame A includes a channel shaped housing 5 which is formed with right angularly arranged top and side walls, as best illustrated in Fig. 2. This channel shaped housing may be cut to any desired length from channel iron stock and for that reason need not be specifically constructed for each different size take-up. The opposite ends of the channel shaped housing 5 have permanently secured thereto, as by welding 6, the end mounting brackets 7. These end brackets are of angular formation and each consists of a branch 8 which is welded to an end of the housing 5 and a right angularly arranged branch 9 having an aperture 10 formed therein for the reception of a suitable securing device.

The branches 8 of the end brackets 7 are each provided with a journal bearing 11 which rotatably receives the threaded take-up screw B. This screw is of sufficient length to extend beyond the branches 8 of the end brackets 7. If desired, this screw may be cut to proper length from a piece of threaded stock of proper diameter and after being inserted through the apertures 11 of the brackets 7 nuts 12 may be threaded on the projected ends of the screw. It is intended that the nuts be permanently secured to the ends of the screw so that they may be employed for rotating the screw by applying a suitable wrench to the same. It also is desired to permanently connect the nuts to the ends of the screw so that they will not be unintentionally loosened during use. Two different methods of permanently connecting the nuts to the screws are illustrated in Fig. 1. The nut at the right-hand end of the screw is illustrated as being welded at 13 to the screw. The left-hand nut is illustrated as being permanently connected to the screw by means of a rivet 14 which is driven through both the nut and the screw.

If the take-up screw B is cut from a threaded rod to a desired length, it will be appreciated that a special screw need not be provided for each length take-up. If desired, however, the take-up screw may be provided with an integral head at one end to take the place of one of the nuts 12, illustrated in Fig. 1. It also will be understood that where either one or two nuts are employed, they may be secured permanently to the screw either by the welding method indicated at 13 or the rivet method indicated at 14.

The particular type of bearing C as shown in Figs. 1 and 2 has been selected to illustrate the invention, but it is to be understood that I do not desire to limit myself to this particular form of bearing. The invention is intended to include either a babbitted, a bronze bushed, or an anti-friction bearing and wherever the term "bearing" is employed in the specification and claim, it is to be understood that I intend to include all of these types of bearings.

The bearing base D is formed integrally with the bearing C and is designed to encircle the channel shaped housing 5 of the frame A and the take-up screw B.

Figure 2 discloses the base as including a bearing pad 15 which is intended to ride upon the top surface of the channel shaped housing 5. The ends of the base D consist of guide walls or lugs 16, (see Figs. 2 and 3), which are arranged in parallelism with each other. Figures 2 and 3 disclose these walls or lugs 16 as having connected integrally with their lower edge portions a transversely extending bridge piece 17. This bridge piece has formed integrally therewith an upstanding socket 18. This socket opens downwardly at 19 through the bridge piece 17. The socket functions to receive and hold against rotation the nut E which is threaded on the take-up screw B. It will be seen by inspecting Figures 1 and 2 that the walls of the socket 18 connect the base and bearing D and C to the nut E so that movement of the nut along the take-up screw B will result in a similar movement of the bearing along the frame A.

It will be noted from the above description of the frame A, the take-up screw B, and the bearing C with its base D, that after all of these elements are assembled there will be no likelihood of any of the parts becoming loosened during use with the result that the bearing cannot become clamped or jammed. This is a very desirable feature for protected screw take-ups.

To effect the assembly of this take-up, the channel shaped housing 5 is first inserted through the base D of the bearing. The end brackets 7 are then welded to the opposite ends of the housing member. This welding of the brackets to the housing member prevents removal of the bearing from the said housing member. The take-up screw B is then inserted through the bearing opening 11 of one end bracket 7 and through one of the two apertures 20 formed in the socket 18 of the base D. The nut E then is threaded onto the take-up screw B. By rotating the take-up screw relative to the nut, the screw may be fed through the remaining aperture 20 of the socket 18 and through the remainder of the length of the frame A until the end of the screw projects beyond the second end bracket 7. The nuts 12 then may be permanently secured to the opposite ends of the take-up screw B if two nuts are employed. If the take-up screw is provided with a fixed head at one end of course, the single threaded end of the screw may be provided with a nut 12 which is permanently secured thereto.

It will be appreciated that the bearing C and its base D will be made heavy enough so that it will not break and there will be no occasion to remove it from or replace it on the frame. If the bearing surface of the bearing C becomes worn or requires removal, the casting can be re-babbitted, fitted with a new bronze bushing, or an anti-friction bearing assembly inserted. With such a rugged bearing and base structure, the take-up should not need to be dissembled if subjected to normal use. If for some abnormal operating condition, the cast bearing should break, it will be possible to remove the bearing by chipping away the weld connection at 6 between the frame housing 5 and one end bracket 7. The nut 12 at the end of the frame, where the welding 6 is removed, may be removed from the take-up screw B by chipping away the welding 13 or by driving out the rivet 14, depending upon the method employed for connecting the nut to the screw. If it becomes necessary to replace the take-up screw, one of the nuts 12 may be removed in the manner just described and the take-up screw may then be withdrawn and a new one substituted.

It will be appreciated that this type of protected screw take-up possesses many advantages. It is of exceedingly simple, strong and rigid construction. The axis of the shaft which is journaled in the bearing C is located a minimum distance from the surface against which the take-up is secured by means of the end brackets 7. The housing 5 also is located very close to the supporting surface and for that reason is extremely effective in protecting the take-up screw B. Due to the weld connection between the several parts of the take-up frame A, the entire frame constitutes a single unit, after assembly, instead of a number of parts bolted together. The frame, therefore, will not become loosened during use. The entire device occupies a minimum amount of space which is very desirable in devices of this character.

It is to be understood that the forms of this invention herewith shown and described are to be taken as the preferred examples of the same and that various changes in the shape, size, and arrangement of parts may be resorted to without departing from the spirit of the invention or the scope of the subjoined claim.

Having thus described the invention, I claim:

A protected screw take-up comprising a frame consisting of a protective housing and angle mounting brackets welded to the ends of the housing, a take-up screw positioned in the channel of the housing and journaled in the brackets, screw adjusting heads permanently fastened on the ends of the screw outwardly of said brackets to hold the screw against endwise movement relative to the frame, a nut threaded on the screw within the housing, and a one-piece bearing and base slidably mounted on the frame and encircling the housing and screw, said bearing base comprising side walls depending from the bearing on opposite sides of the housing, a bridge piece connected to the side walls beneath said housing, and an outwardly opening, upstanding socket projecting into the channel of the housing to receive said nut.

RICHARD F. BERGMANN.